(12) United States Patent
Hegde

(10) Patent No.: US 8,837,454 B2
(45) Date of Patent: Sep. 16, 2014

(54) SIMULTANEOUS MULTIBAND OPERATION OF A MIMO COMMUNICATION DEVICE

(75) Inventor: Gireesh Hegde, Karnataka (IN)

(73) Assignee: Broadcom Corporation, Irvine, CA (US)

(*) Notice: Subject to any disclaimer, the term of this patent is extended or adjusted under 35 U.S.C. 154(b) by 63 days.

(21) Appl. No.: 13/466,516

(22) Filed: May 8, 2012

(65) Prior Publication Data

US 2013/0301631 A1    Nov. 14, 2013

(51) Int. Cl.
*H04B 7/208* (2006.01)

(52) U.S. Cl.
USPC .................... 370/344; 370/330; 370/491

(58) Field of Classification Search
None
See application file for complete search history.

(56) References Cited

U.S. PATENT DOCUMENTS

| | | | |
|---|---|---|---|
| 2003/0119547 A1* | 6/2003 | Leyh et al. | 455/552 |
| 2006/0221894 A1* | 10/2006 | Casaccia et al. | 370/328 |
| 2008/0057886 A1* | 3/2008 | Feher | 455/151.1 |
| 2009/0034438 A1* | 2/2009 | Soulie et al. | 370/280 |
| 2009/0168701 A1* | 7/2009 | White et al. | 370/328 |
| 2012/0134279 A1* | 5/2012 | Tamaki | 370/248 |
| 2012/0243446 A1* | 9/2012 | Mueller et al. | 370/280 |

FOREIGN PATENT DOCUMENTS

GB    2472978    3/2011

OTHER PUBLICATIONS

European Search Report from corresponding European Patent Application No. 12 00 6414, 2pgs., Jan. 10, 2014.
Atheros, "AR9287", http://qca.qualcomm.com/media/product/product_80_file1.pdf, retrieved Jan. 9, 2014, 2pgs., Oct. 26, 2010.
Mobile Satellite Services (mss): "COM-3505 Dual Band- 2.4/5 GHz 2x2 MIMO Transceiver", http//comblock.com/download/com3502.pdf, retrieved Jan. 9, 2014, 9pgs., Jan. 15, 2012.
IEEE Standard for Information Technology—Telecommunications and information exchange between systems local and metropolitan area networks—Specific requirements Part 11: Wireless LAN Medium Access Control (MAC) and Physical Layer (PHY) Specifications: IEEE Std. 802.11-2012 (Revision of IEEE Std 802.1), Chapter 5 and Chapter 9, Mar. 29, 2012.

* cited by examiner

*Primary Examiner* — Ian N Moore
*Assistant Examiner* — Eric P Smith
(74) *Attorney, Agent, or Firm* — Brinks Gilson & Lione

(57) ABSTRACT

A system and method is presented to support simultaneous connections to multiple network connections. For example, a wireless radio of a communication device may be used to transmit or receive data from two network channels, each associated with a network connection. The communication device may allocate a first set of resources from the wireless radio to be used to communicate across a first network channel and allocate a second set of communication resources from the wireless radio to be used to simultaneously communicate a cross a second network channel.

20 Claims, 7 Drawing Sheets

US 8,837,454 B2

SIMULTANEOUS MULTIBAND OPERATION OF A MIMO COMMUNICATION DEVICE

1. TECHNICAL FIELD

This disclosure relates to wireless communication. More particularly, this disclosure relates to simultaneous multiband operation of a Multiple-Input-Multiple-Output ("MIMO") communication device.

2. BACKGROUND

Continual development and rapid improvement in modern technology has resulted in the widespread availability and use of mobile communication devices. Consumers continue to demand and purchase mobile devices with additional capabilities. Consequently, mobile communication device and component manufacturers are continually developing additional communication features for mobile communication devices, such as cellular phones.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below makes reference to a communication device. A communication device may take many different forms and have many different functions. As one example, a communication device may be a cellular phone capable of making and receiving wireless phone calls. The communication device may also be a smartphone that, in addition to making and receiving phone calls, runs general purpose applications. A communication device may be virtually any device that wirelessly connects to a network, including as additional examples a driver assistance module in a vehicle, an emergency transponder, a pager, a satellite television receiver, a networked stereo receiver, a computer system, music player, or virtually any other device. The discussion below addresses how a communication device can simultaneously communicate across multiple network channels using a communication resource, such as a wireless communication radio.

Figure 1:
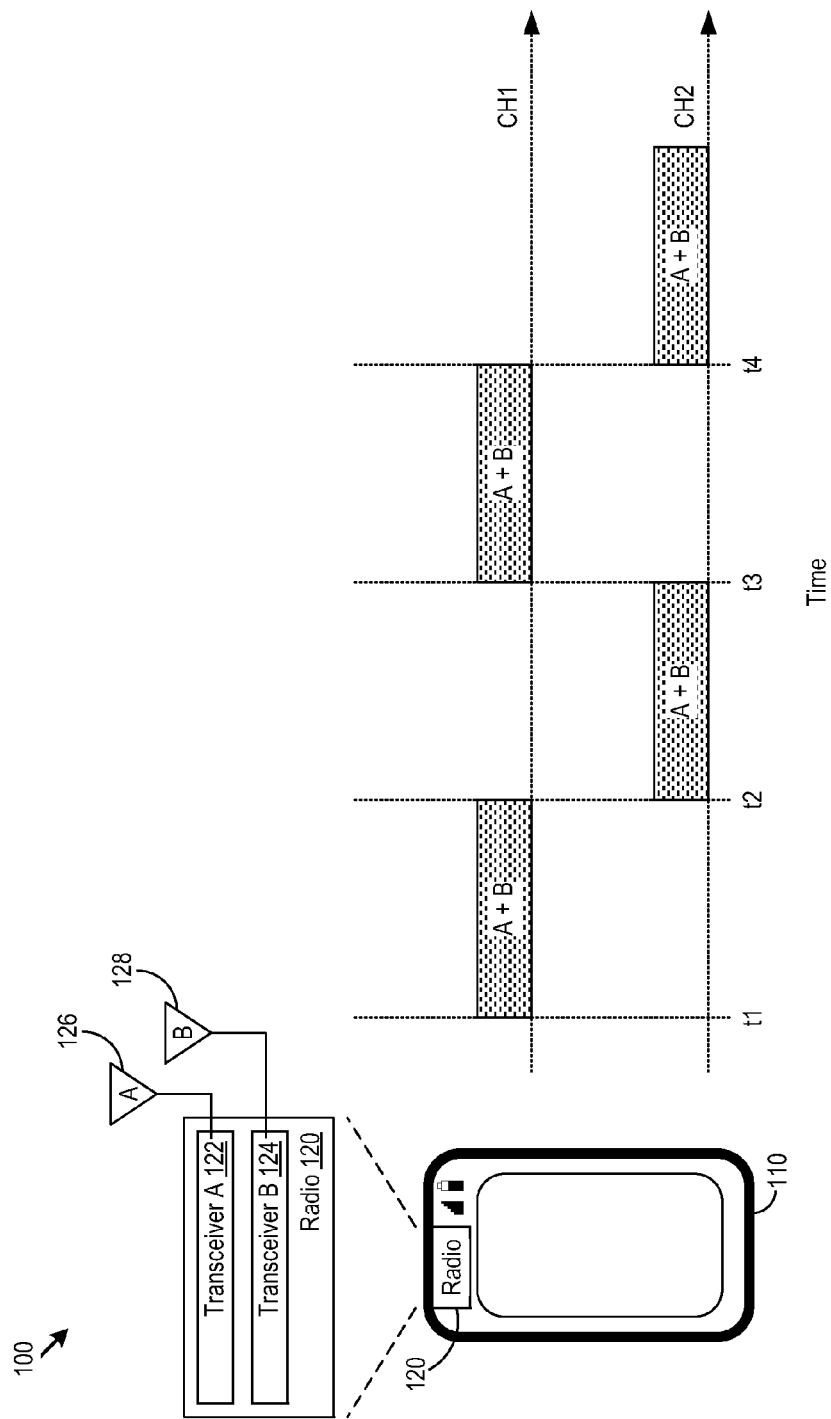
FIG. 1 shows a time multiplexing communication method.

FIG. 1 shows a time multiplexing communication method 100. A communication device 110 may include a wireless communication radio 120 that includes transceiver A 122 and transceiver B 124. Transceiver A 122 includes an antenna A 126 and transceiver B includes an antenna B 128. A transceiver (e.g., transceiver A 122 or transceiver B 124) may include a Digital-To-Analog ("D/A") converter, an Analog-To-Digital ("A/D") converter, an amplifier, a modulator, a waveform shaper, and any additional hardware that drive an antenna (e.g., antenna A 126 or antenna B 128). The transceiver A 122 may transmit or receive data through antenna A 126 and the transceiver B 124 may transmit or receive data through antenna B 128. The communication device 110 may employ a multiple input/multiple output ("MIMO") communication technique to communicate using multiple transceivers across a network channel. A network channel may refer to a communication channel within a wireless frequency band. For example, network channels may refer to communication channels used by communication standards such as 802.11a, 802.11b, 802.11g, 802.11n, or 802.11ac, Worldwide Interoperability for Microwave Access ("WiMAX"), Bluetooth, HSPA+, 4G, 3GPP LTE, and others.

The wireless communication radio 120 may transmit and receive data across two network channels using a time multiplexing technique and further using a multiple input/multiple output (MIMO) technique. To illustrate, at time t1, the wireless communication radio 120 transmits data across a first network channel CH1 using both transceiver A 122 to drive antenna A 126 and transceiver B 124 to drive antenna B 128. At a later time t2, the wireless communication radio 120 transmits data across a second network channel CH2, again using both transceiver A 122 and transceiver B 124. The wireless communication radio 120 may alternate between transmitting data across the first network channel and transmitting data across the second network channel, as further shown at times t3 and t4. According to the time multiplexing communication method 100, at any point in time, all communication resources associated with the wireless radio 120 (e.g., transceiver A 122 and transceiver B 124) are used to communicate across a single network channel. The time multiplexing communication method 100 may also be referred to as single band communication because the communication device 110 communicates across a single network channel at any point in time.

Figure 2:
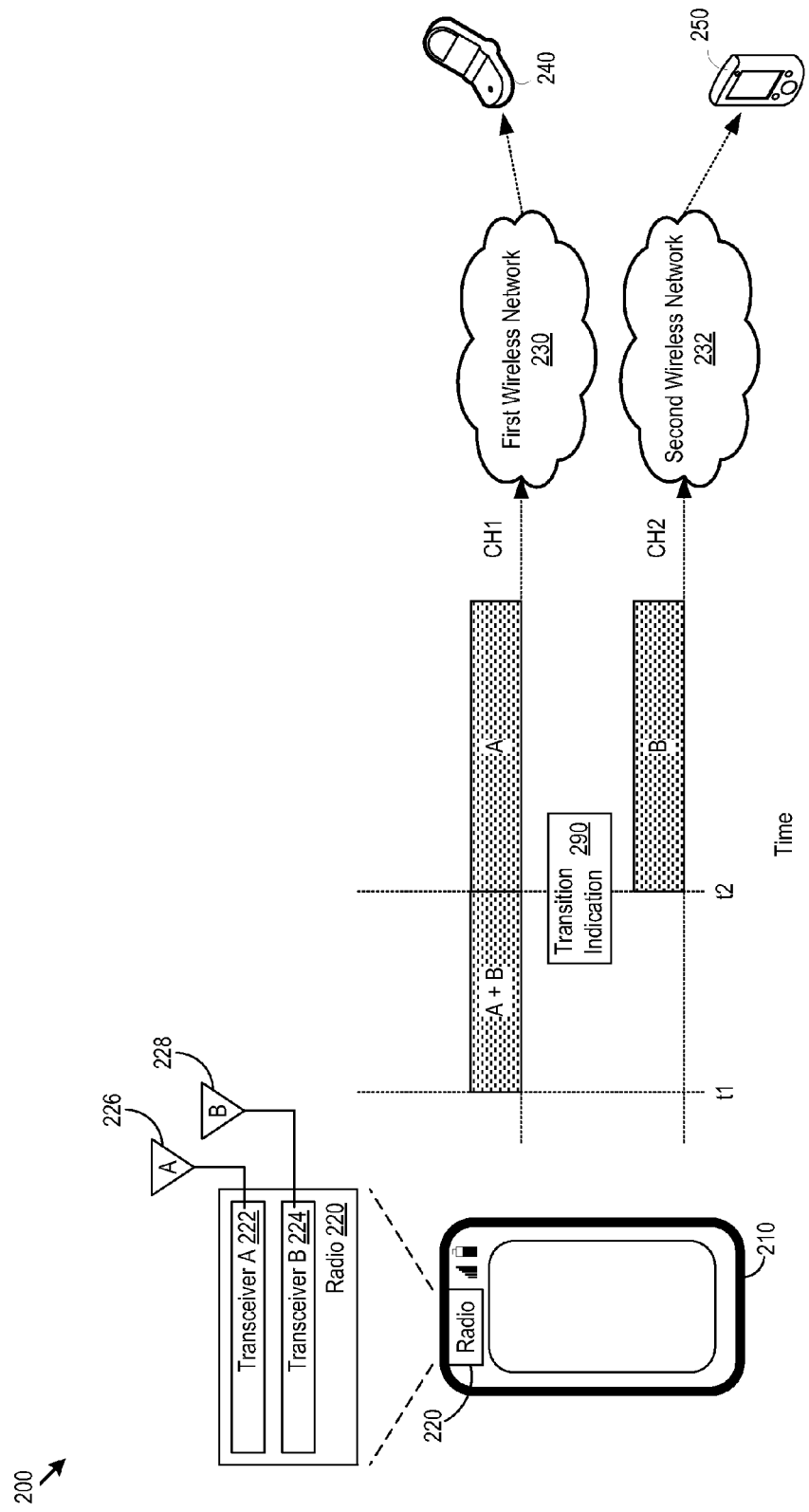
FIG. 2 shows a timing example of simultaneous multiband communication.

In contrast, FIG. 2 shows a timing example 200 of simultaneous multiband communication. A communication device 210 may include a wireless communication radio 220. The wireless communication radio 220 may transmit and receive data according to a wireless communication standard, such as any of the communication standards previously listed. The wireless communication radio 220 may also include multiple transceivers, such as transceiver A 222 and transceiver B 224 in this example. Transceiver A 222 and transceiver B 224 may each include an antenna, such as antenna A 226 and antenna B 228 respectively, through which the transceiver may transmit or receive data. Alternatively, the wireless communication radio 220 may include a number of transmitters used for transmitting data and a number of receivers for receiving data. For example, the communication device 210 may include a M×N MIMO communication radio, that includes M number of transmitters and N number of receivers. A transmitter, receiver, or transceiver may be implemented in a physical ("PHY") portion or PHY core of the wireless communication device 210.

In operation, the wireless communication radio 220 may use transceiver A 222 and transceiver B 224 to transmit data across a single network channel, such as CH1. To illustrate, at time t1, the wireless communication radio 220 may transmit data across network channel CH1 using both transceiver A 222 and transceiver B 224. In a similar fashion, the wireless communication radio 220 may receive data through network channel CH1 using transceiver A 222 and transceiver B 224. In communicating across network channel CH1, the communication device 210 may, for example, communicate with a first device 240 through a first wireless network 230.

The communication device 210 and the wireless communication radio 220 may also communicate across multiple network channels at the same time. As an example, at time t2, the wireless communication radio 220 operates in a simultaneous multiband communication mode.

The communication device 210 may recognize a transition indication 290 at time t2 to the wireless communication radio 220 based a request to communicate across a second network channel, such as network channel CH2. A transition indication (e.g., the transition indication 290) may be a message sent from a controller or system logic in the communication device 210 to the transceivers indicating a change in communication mode. Optionally, the indication 290 may specify which transceiver to use to communicate across a communication network. Alternatively, a transition indication may be a message sent from a network controller to the device 210 or a message from devices trying to connect to the communication device 210 (e.g., the second device 250). A device may send a transition indication to the transceivers for any number of reasons. For example, the communication device 210 may send a transition indication to the transceivers upon expiration of a timer configured by system logic in the device 210 or from other devices. The communication device 210 or other devices may also recognize or send a transition indication based on a communication parameter, a security parameter, a power usage parameter, or more. Changes in the communication device 210 or a device the communication device 210 is communicatively coupled to may also the system logic warrant sending a transition indication to the transceivers.

The request to communicate across network channel CH2 may arise from a transition condition, including as activity on the communication device 210, activity on a second device 250, or elsewhere. For example, an application executing on the communication device 210 may request that data be transmitted through a second wireless network 232. As another example, the second device 250 may transmit data to the communication device 210 using network channel CH2 of the second wireless network 232, and further request the communication device 210 transmit a response through network channel CH2. The communication device 210 may transition to a simultaneous multiband communication mode in any circumstance where the communication device 210 may communicate with multiple devices, across multiple networks, or across multiple network connections. The communication device 210 may determine which transceiver(s) to allocate to a network connection based on any number of factors, such as data throughput requirements, Quality of Service, signal conditions, security requirements, power management, or more. Also, the communication device 210 may transition to a simultaneous multiband communication mode at any time the communication device 210 is communicating in a time division manner (e.g., single band communication as described in FIG. 1)

To support simultaneous multiband communication, the communication device 210 may allocate resources of the wireless communication radio 220 to simultaneously communicate across network channel CH1 and network channel CH2. For example, the communication device 210 may allocate transceiver A 222 to communicate across network channel CH1 and transceiver B 224 to communicate across network channel CH2. Accordingly, at time t2, the communication device 210 may simultaneously communicate data across multiple network channels (e.g., across network channels CH1 and CH2). The wireless radio 220 may use transceiver A 222 to communicate with a first device 240 across network channel CH1 through a first wireless network 230. At the same time, the wireless radio 220 may use transceiver B 224 to communicate with a second device 250 across network channel CH2 through a second wireless network 232.

In simultaneously communicating across multiple network channels, the communication device 210 may receive data from multiple networks (e.g., the first wireless network 230 and the second wireless network 232) at the same time. For example, the communication device 210 can receive Access Point ("AP") beacon messages from both the first wireless network 230 and the second wireless network 232 even if these beacon messages overlap in reception time. Similarly, the communication device 210, when operating in a simultaneous multiband communication mode, can broadcast packets to both the first wireless network 230 and the second wireless network 232 even when packet transmission times overlap. Also, when operating in a simultaneous multiband communication mode, the communication device 210 may reduce the overhead required to continually transition communication resources to communicate across one network channel to a next while operating in single band communication mode.

Figure 3:
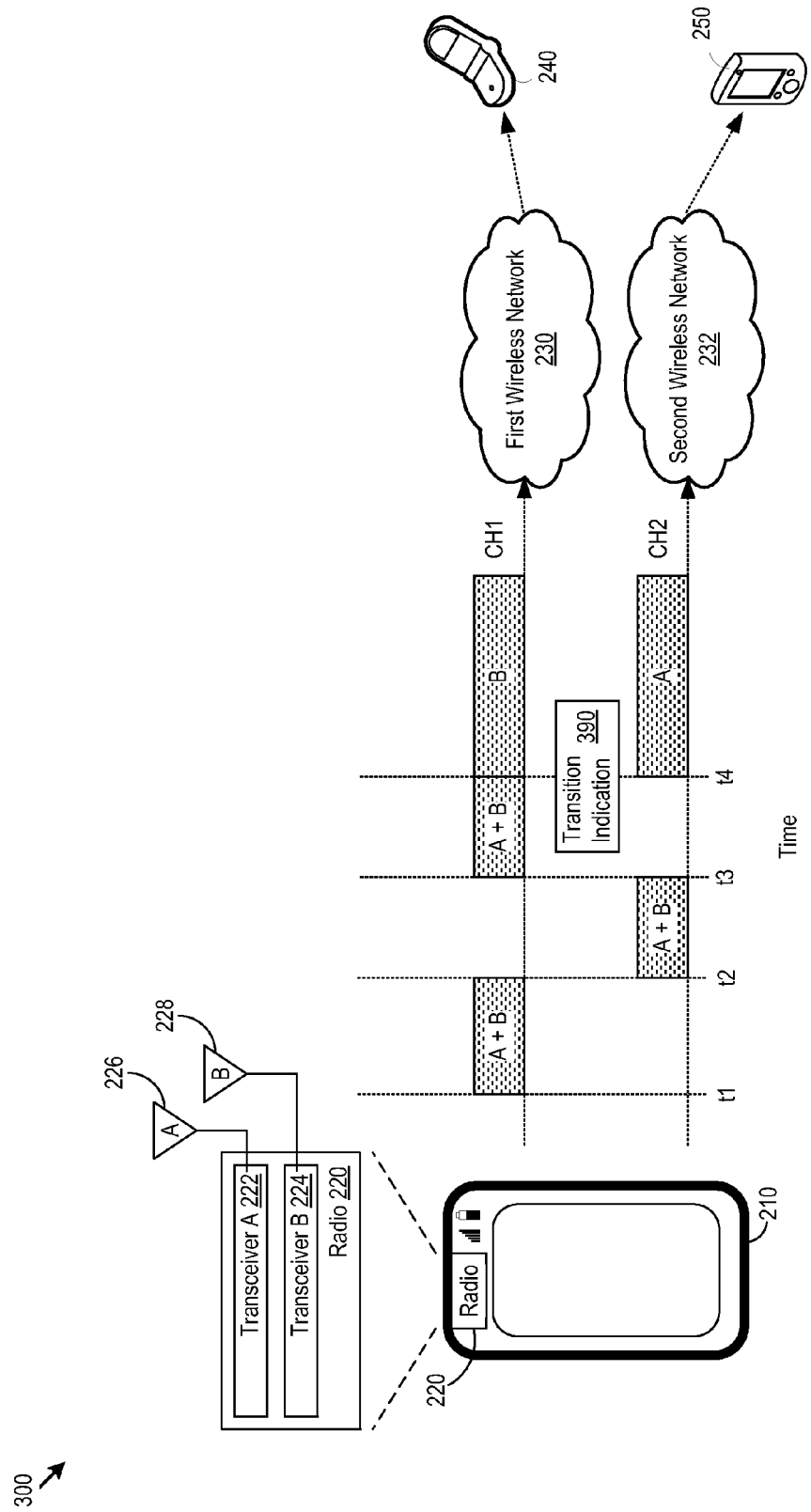
FIG. 3 shows another timing example of simultaneous multiband communication.

FIG. 3 shows another timing example 300 of simultaneous multiband communication. As described previously, the communication device 210 may include a wireless communication radio 210 that includes transceiver A 222 and transceiver B 224. Transceiver A 222 may include antenna A 226 and transceiver B 224 may include antenna B 228. From time t1 to t4, the communication device 210 may communicate across a first network channel CH1 and a second network channel CH2 in a single band communication mode. That is, while the communication device 210 is operating in a single band communication mode, at any point in time communication resources associated with wireless radio 220 (e.g., transceiver A 222 and transceiver B 224) may be used to communicate across a single network channel. At time t1, the communication device 210 may communicate (e.g., transmit data or receive data) across network channel CH1 using both transceiver A 222 and transceiver B 224. As shown in FIG. 2, the communication device 210 may communicate with a first device 240 across network channel CH1 and through a first wireless network 230.

At time t2, the communication device 210 may continue to communicate in single band communication mode. However, at time t2, the communication device 210 may instruct the wireless radio 220 to cease communicating across network channel CH1 and instead communicate across network channel CH2. In response, the wireless radio 220 may divert communication resources associated with the wireless radio 220 to communicate across network channel CH2 instead. Accordingly, at time t2, the wireless radio 220 may use transceiver A 222 and transceiver B 224 to communicate across network channel CH2 and through a second wireless network 232. In this way, the communication device 210 may communicate, for example, with the second device 250. At time t3, the communication device 210 may resume communication across network channel CH1 while continuing to operate in a single band communication mode.

At time t4, the wireless radio 220 may receive a transition indication 390 from system logic of the communication device 210 to transition operation into a multiband communication mode. As discussed above, the communication device 210 may allocate resources from the wireless radio 220 to support communicating in the multiband communication mode. As shown in FIG. 3, the communication device 210 may allocate transceiver B 224 to be used for communicating with the first device 240 across network channel CH1 and through the first wireless network 230. The communication device 210 may also allocate transceiver A 222 to be used for communicating with the second device 250 across network channel CH2 and through the second wireless network 232. The allocation of communication resources by the communication device 210 may be implemented as system logic, as described in greater detail below.

Figure 7:
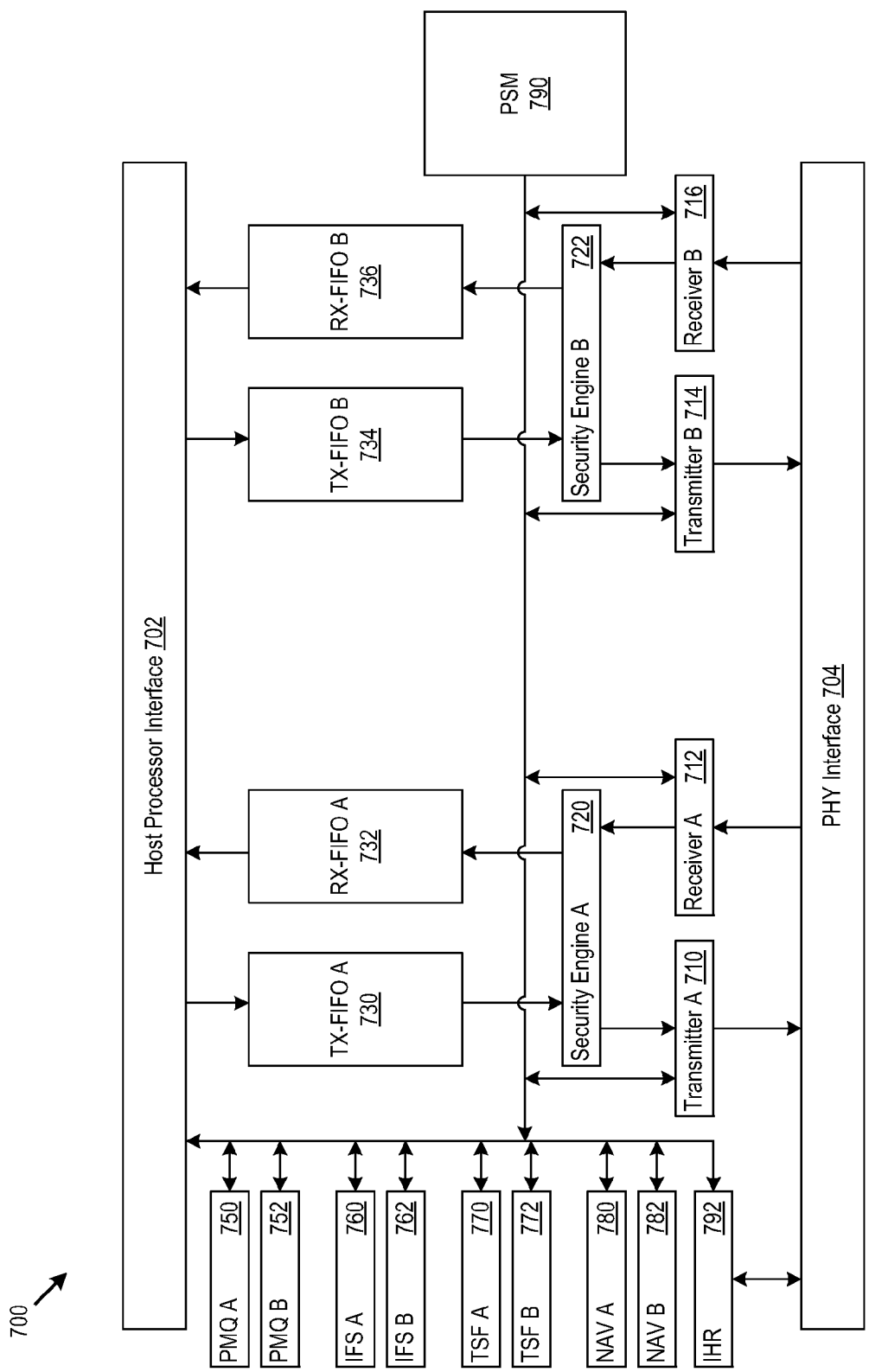
FIG. 7 shows an example of MAC related architecture, some of which may have been replicated to support simultaneous multiband communication.

As the communication device 210 and the wireless radio 220 were previously operating in a single band communication mode prior to receiving the transition indication 390, the communication device 210 may replicate additional resources to support simultaneous multiband communication. For example, when communicating in a single band communication mode, the communication device 210 may use a single Media Access Control ("MAC") related architecture and set of MAC related resources to support communications across a single network channel. In order to support operating in a multiband communication mode, the communication device 210 may replicate communication resources, such as MAC related architecture. To illustrate, the communication device 210 may assign the MAC related resources previously used in the single band communication mode for use with transceiver B to communicate across network channel CH1. Next, the communication device 210 may replicate some MAC related architecture for use with transceiver A 222 to communicate across network channel CH2. Replication of the MAC related architecture may be implemented in software. Details concerning specific MAC related elements for replication in connection with a multiband communication mode are depicted in FIG. 7 and discussed in greater detail below.

After the communication device 210 has allocated communication resources of the wireless radio 220 and replicated any additional MAC related architecture, the communication device 210 may simultaneously communicate with the first device 240 and the second device 250 across different network channels and different wireless networks using a single radio. This simultaneous multiband communication is illustrated in FIG. 3 from time t4 and onward.

Figure 4:
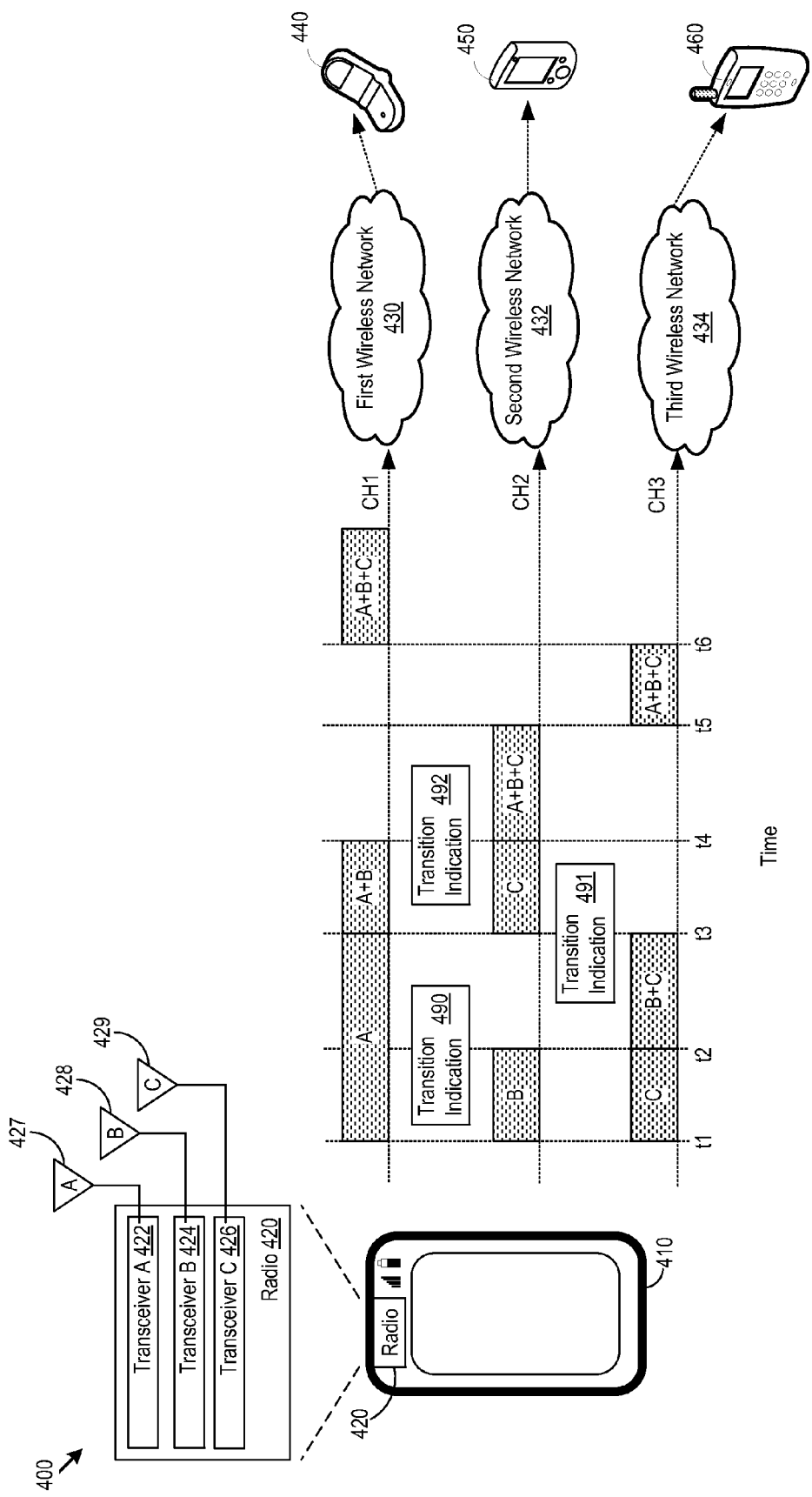
FIG. 4 shows a timing example of simultaneous multiband communication.

FIG. 4 shows a timing example 400 of simultaneous multiband communication. The communication device 410 depicted in FIG. 4 includes a wireless communication radio 420. The wireless communication radio 420 includes three transceivers—transceiver A 422, transceiver B 424, and transceiver C 426. Transceiver A includes antenna A 427, transceiver B includes antenna B 428, and transceiver C 426 includes antenna C 429. The communication device 410 may be able to operate in a single band communication mode and various multiband communication modes.

At time t1, the communication device 410 and the wireless communication radio 420 may operate in multiband communication mode where each of the three transceivers communicates, at the same time, across a respective single network channel. That is, at time t1, the communication device 410 may use transceiver A 422 to communicate with a first device 440 across network channel CH1 and through a first wireless network 430. At the same time, transceiver B 424 may be used to communicate with a second network device 450 across network channel CH2 and through a second wireless network 432. Similarly, transceiver C 426 may be used to simultaneously communicate with a third network device 460 across network channel CH3 and through a third wireless network 434.

At time t2, the wireless radio 420 may receive a transition indication 490 to operate in multiband communication mode differently (or, alternatively, in a different multiband communication mode). For example, a communication or communication session with the second device 450 may have completed at time t2, freeing the communication resources associated with communications across network channel CH2 (e.g., transceiver B 424) for another use. Accordingly, the communication device 410 may assign transceiver B 424 to be used with transceiver C 426 for communicating across network channel CH3. The wireless communication radio 420 may continue to use transceiver A 426 to communicate across network channel CH1.

At time t2, the communication device 410 may cease communicating across network channel CH2. As such, communication resources previously associated with communicating across network channel CH2 from prior to time t2 may be deallocated by the communication device 410. For example, replicated MAC related architecture associated with transceiver B 424 and used in communicating across network channel CH2 prior to time t2 may be deallocated by system logic of the communication device 410.

At time t3, the wireless communication radio 420 may receive a transition indication 491 to operate differently or in a different simultaneous multiband mode by communicating across network channels CH2 and CH3 instead. As such, the communication device 410 may allocate transceiver C 426 to communicate across network channel CH2 and allocate transceiver A 422 and transceiver B 424 to communicate across network channel CH1. The communication device 410 may also deallocate the MAC related architecture that was previously used to communicate across network CH3 as well. The communication device 410 may further replicate MAC related architecture for use in communicating across network channel CH2. Alternatively, the communication device 410 may transition the MAC related architecture used from time t2 to t3 to communicate across network channel CH3 for use in communicating across network channel CH2 from t3 onward. At time t3, the communication device 410 may simultaneously communicate across network channels CH1 and CH2.

At time t4, the wireless communication radio 420 may receive a transition indication 492 to operate in single band communication mode. Accordingly, replicated additional MAC architecture used to support simultaneous multiband communication may be deallocated. The communication device 410 may then transition to communicating across a single network channel, such as network channel CH2 at time t4, network channel CH3 at time t5, and network channel CH1 at time t6. All three transceivers may be used by the wireless radio 220 to communicate across network channel CH2 at time t4, network channel CH3 at time t5, and network channel CH1 at time t6.

Figure 5:
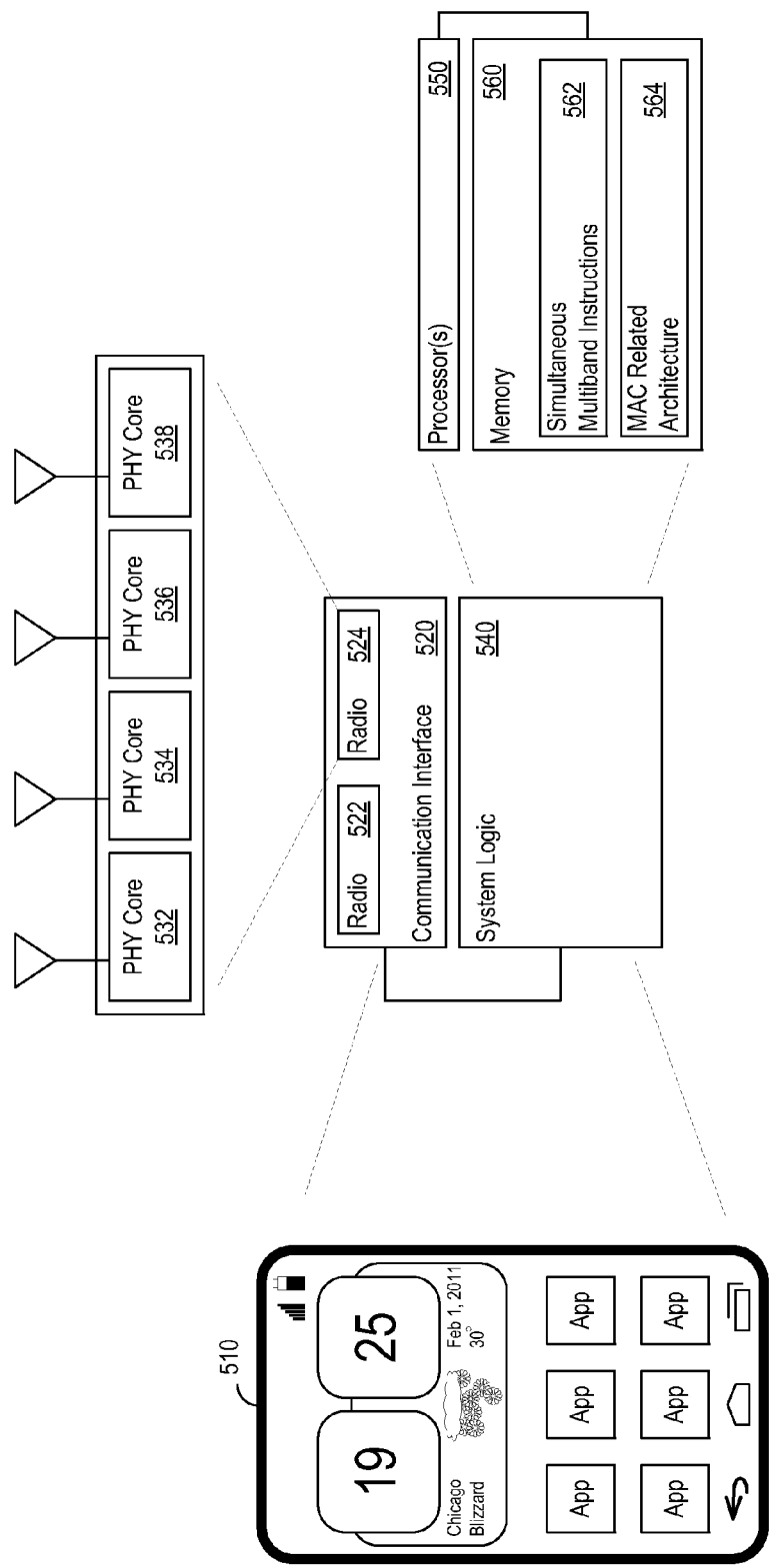
FIG. 5 shows an example of a mobile communication device that supports simultaneous multiband communication.

FIG. 5 shows an example of a mobile communication device 510 that supports simultaneous multiband communication. The communication device 510 includes a communication interface 520. The communication interface 520 may include multiple radios, such as a radio 522 and a radio 524 depicted in FIG. 5. Each radio of the communication device 510 may be operable to communicate according to a communication type or standard. For example, the radio 522 may be a WiFi radio, a cellular radio, a Bluetooth radio, or any other type of wireless communication radio. The radio 522 and the radio 524 may be configured to communicate according to different communication types or standards. As an example, the radio 522 may be a WiFi radio and the radio 524 may be a Bluetooth radio.

Each radio of the communication device 510 (e.g., the radio 522 and the radio 524) may include multiple PHY cores. The radio 524 includes a PHY Core 532, a PHY Core 534, a PHY Core 536, and a PHY Core 538. A PHY Core may include a transmitter, a receiver, or both (e.g., a transceiver). A PHY Core containing a transceiver may be referred to as a PHY transceiver Core. PHY Cores 532, 534, 536, and 538 may each be a PHY transceiver core that includes a transceiver. The PHY Cores 532, 534, 536, and 538 may also include a register space. A portion of the register space may be used to track a current communication mode of the PHY Core. A portion of the register space may also be used to track a network channel the PHY Core is currently allocated or assigned to communicate across.

The communication device 510 depicted in FIG. 5 also includes system logic 540, which is communicatively coupled to the communication interface 520. The system logic 540 may be implemented in hardware, software, or both, such as with a processor 550 (or multiple processors) and a memory 560 communicatively coupled to the processor 550. The memory 560 may store simultaneous multiband instructions 562, that when executed by the processor 550, cause a communication device 510 to communicate in a single band communication mode or various simultaneous multiband communication modes, such as the communication modes described in FIGS. 1-4 above. The memory 560 may also store MAC related architecture 564 (e.g., a packet queue or a security engine) that may have been replicated in connection with a simultaneous multiband communication mode.

In operation, the system logic 540 may configure a radio, such as the radio 524, to communicate across a single network channel or simultaneously communicate across multiple network channels. The system logic 540 may control the communication mode of the radio 524, for instance by transmitting a transition indication to the radio 524 that may change the communication mode of the radio 524. The system logic 540 may also allocate communication resources associated with the radio 524 used in a communication mode. For example, in a simultaneous multiband communication mode, the system logic 540 may allocate the PHY Core 532 for use in communicating across a first network channel and allocate the PHY Cores 534, 536, and 538 for communicating across a second network channel at the same time. The system logic 540 may update each respective register space of the PHY Cores 532, 534, 536, and 538 in order to reflect the updated communication mode and the respective assigned network channel. Specifically, the system logic 540 may update the register space of the PHY Core 532 to indicate the updated communication mode of the radio 524 and the particular network channel the PHY Core 532 has been allocated to communicate across. The system logic 540 may update the respective register spaces of the PHY Cores 534, 536, and 538 in a similar fashion.

As another example, the system logic 540 may allocate the PHY Core 532 to communicate across a first network channel, the PHY Core 534 to communicate across a second network channel, the PHY Core 536 to communicate across a first network channel, and the PHY Core 538 to communicate across a fourth network channel. The PHY Cores 532, 534, 536, and 538 may transmit or receive data across the each of the respective assigned network channels at the same time. In the above example, the system logic 540 is essentially configuring the radio 524 to operate as four Single-Input-Single-Output ("SISO") systems. In other words, the system logic 540 may maintain four separate network connections through the radio 524, one connection for each PHY Core in the radio 524. Along the same lines, the system logic 540 may support up to M number of network connections in a radio that includes M number of PHY transceiver cores. Similarly, the system logic 540 may support up to M number of network connections in an M×M communication radio that includes M number of transmitters and M number of receivers. The system logic 540 may control the communication mode of other radios of the communication device 510, such as the radio 522, in a similar way.

When the system logic 540 changes the communication mode of a radio of the communication device 510, existing communication parameters for communicating with a network device may be altered. For example, at a first point in time t1, the radio 524 may communicate in a single band communication mode, using the PHY Cores 532, 534, 536, and 538 to communicate with a first device (e.g., the first device 240) across a first network channel. At a later point in time t2, the system logic 540 may transmit a transition indication to the radio 524 in order to simultaneously communicate with a second device (e.g., the second device 250) across a second network channel. To support such a simultaneous multiband communication mode, the system logic 540 may allocate the PHY Cores 532 and 534 to continue communicating with the first device across the first network channel and allocate the PHY Cores 536 and 538 to communicate with the second device across the second network channel.

In the above example, the communication parameters for communicating with the first device will change at time t2 when the radio 524 transitions to a simultaneous multiband communication mode. That is, at time t2, the wireless radio 524 will transition from communicating with the first device using four PHY transceiver cores to communicating with the first device using two PHY transceiver cores. At this point, the system logic 540 may transmit an indication message through the first network channel to the first device indicating the change in communication parameters. The indication message may indicate to the first device that the communication device 510 will now transmit data to the first device using two PHY transceiver cores, specifically the PHY Cores 532 and 534. Similarly, the indication message may indicate that the communication device 510 will now receive data from the first device using the two PHY transceiver cores, which may affect how the first device communicates data to the communication device 510. Whenever communication parameters with a device change (e.g., when a radio of the communication device 510 changes communication mode), the system logic 540 may transmit a similar indication message to the affected device.

Figure 6:
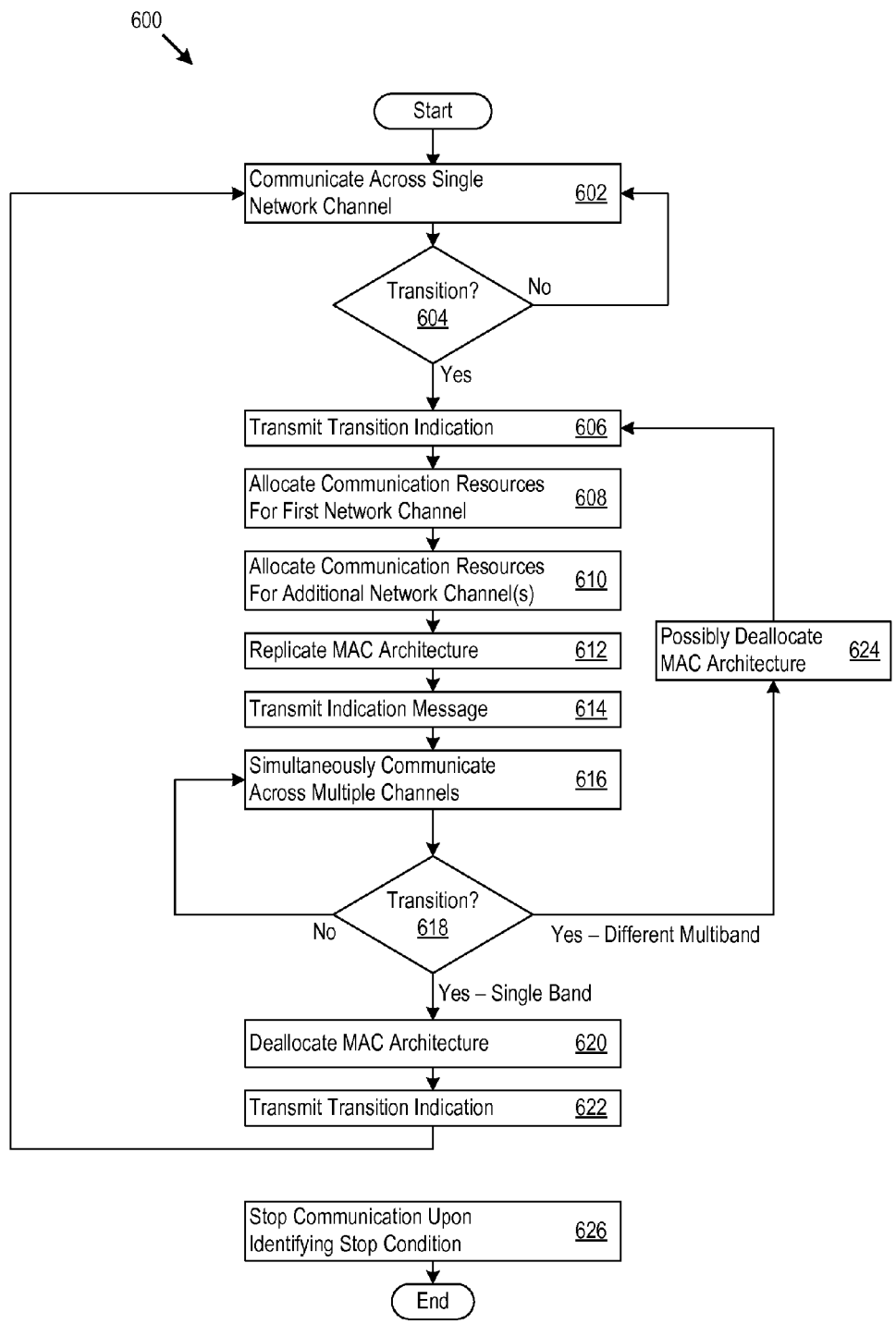
FIG. 6 shows an example of simultaneous multiband logic that a communication device may implement in hardware, software, or both.

FIG. 6 shows an example of simultaneous multiband logic 600 that the communication device 510 may implement in hardware, software, or both. The simultaneous multiband instructions 562 may implement the logic 600, for example. The simultaneous multiband logic 600 may describe how system logic 540 and a radio 524 transition from operating in a single band communication mode to operating in a multiband communication mode.

The system logic 540 may instruct the radio 524 to communicate across a single network channel using multiple PHY transceiver cores, such as PHY Cores 532, 534, 536, and 538 (602). The radio 524 may operate in a single band communication mode where the PHY Cores 532, 534, 536, and 538 of the radio 524 communicate across the single network channel. The radio 524 may also operate in a single band communication mode where the PHY Cores 532, 534, 536, and 538 of the radio 524 communicate across multiple network channels in a time division manner (e.g., all of the PHY Cores 532-538 communicate across a single network channel at a given point in time).

The system logic 540 may identify a transition condition based on activity on the communication device 510 or other activity (604). The transition condition may be any circumstance that warrants transitioning to a simultaneous multiband communication mode. For example, the transition condition may arise based on activity from the communication device or activity from a device the communication device 510 is communicating with across the first network channel. If no transition condition is identified, the radio 524 may continue to communicate across the first network channel in a single band communication mode. The transition condition may warrant the radio 524 transitioning communication mode to communicate across an additional network channel.

If the transition condition is identified, the system logic 540 may send a transition indication to the radio 524 (606). The transition indication may instruct the radio 524 to operate in a simultaneous multiband communication mode. Then, the system logic 540 may allocate communication resources of the radio 524 to continue communicating across the first network channel (608). For example, the system logic 540 may allocate a first set of PHY transceiver cores of the radio 524 to use in communicating across the first network channel. The system logic 540 may allocate communications of the radio 524 to communicate across a second network channel, such as a second set of PHY transceiver cores of the radio 524 (610). Similarly, the system logic 540 may allocate communication resources to communicate across additional network channel(s) as indicated by the transition condition.

Next, the system logic 540 may replicate additional MAC related architecture to support the simultaneous multiband communication mode (612). A set or instantiation of additional MAC related architecture may be replicated for each additional network connection or each additional network channel the radio 524 will communicate across. Instantiations of additional MAC related architecture replicated by the system logic 540 may be stored in a memory 560 of the communication device 510. Specific additional MAC related architecture that the system logic 540 may replicate is further explained below.

Upon replicating additional MAC related architecture, the system logic 540 may transmit an indication message (614). The indication message may be transmitted to a device communicatively coupled to the communication device 510 through the first network channel. As described above, the indication message may indicate a change in communication parameters in communicating with the device, such as the change in communication resources allocated to the radio 524 for use in communicating with the device. The radio 524 may operate in a simultaneous multiband mode by simultaneously communicating across multiple network channels (616).

The system logic 540 may later identify a transition condition (618) that may warrant transitioning to a single band communication mode or to a simultaneous different multiband communication mode. The system logic 540 may determine to transition to a single band communication mode based on the transition condition. In this case, the system logic 540 may deallocate MAC related architecture used to support the simultaneous multiband communication mode (620). Then, the system logic 540 may send a transition indication to the radio 524 (622), which may instruct the radio 524 to operate in a single band communication mode. The radio 524 may then communicate in a single band communication mode (602).

The system logic 540 may alternatively determine to transition to a different band communication mode based on the transition condition. For example, the transition condition may include a situation where the communication device 510 stops or completes communication with another device, which may obviate the need to communicate across a network channel. To illustrate further, the radio may have supported 4 simultaneous network connections, and upon identifying the transition condition, the system logic 540 may determine to transition to simultaneously communicate across 3 network connections instead. As another example, the transition may include the system logic 540 receiving a request from another device to communicate across a new network channel, which may also prompt the system logic 540 to determine to communicate across a different simultaneous multiband communication mode.

Depending on the transition condition, the system logic 540 may deallocate MAC related architecture (624), such as when the system logic 540 transitions the simultaneous multiband communication mode to support fewer network connections. Then, the system logic 540 may prepare to communicate across the new simultaneous multiband communication mode in a similar fashion as described above (606-616). Of note, the system logic 540 may replicate MAC related architecture (612) to support communication across additional network connections. The system logic 540 may forego replicating MAC related architecture when the new simultaneous multiband communication mode or the transition indication specifies communicating across fewer network connections than before.

The system logic 540 may stop communication in either a single band communication mode or a simultaneous multiband communication mode when a stop condition is identified (626), such as when the communication device 510 enters an idle mode or a power saving mode that does not support network communications or is powered off. Powering off the communication device 510 may be accomplished by, for example, removing or disconnecting one or more operation voltage(s) normally applied to the processor core, by substantially reducing one or more operational voltage(s), or in other ways.

FIG. 7 shows an example of MAC related architecture 700, some of which may have been replicated to support simultaneous multiband communication. The MAC related architecture 700 may be part of a MAC architecture used by a communication device 510 to simultaneously across a first network channel A and a second network channel B. The MAC related architecture 700 includes a host processor interface 702 that may interface with other portions of the communication device 510. The MAC related architecture 700 also includes a PHY interface 704 that may interface with a wireless PHY layer. For example, the wireless PHY layer may consist of digital PHY, analog PHY, and a physical radio.

The MAC related architecture 700 depicted in FIG. 7 also includes a datapath between the host processor interface 702 and the PHY interface 704 that includes transmitter A 710 and a receiver A 712 which may be used to communicate through a first network connection across first network channel A. The MAC related architecture 700 also includes a transmitter B 714 and a receiver B 716 that may be used to simultaneously communicate through a second network connection across a second network channel B.

The MAC related architecture 700 also includes a Security Engine A 720 and a Security Engine B 722. In operation, the Security Engine A 720 may receive data from the transmission First-In-First-Out ("FIFO") Queue A 730. A Security Engine (e.g., the Security Engine A 720 or the Security Engine B 722) may support multiple security standards like Wired Equivalent Policy ("WEP"), Temporal Key Integrity Protocol ("TKIP"), CTR with CBC-MAC Protocol' ("CCMP") which is based on the Advanced Encryption Standard ("AES") encryption algorithm or any other security algorithm used for wireless communication. The Security Engine A 720 may encrypt the received data from TX-FIFO A 730 and then communicate the encrypted data to the transmitter A 710. The Security Engine A 720 may also receive encrypted data from the receiver A 712, decrypt the received data and pass the decrypted data to the reception FIFO Queue A 732. The MAC related architecture 700 also includes a similar security engine B 722 may be similarly used in connection with communicating across the second network channel B.

The MAC related architecture 700 also includes the transmission ("FIFO") Queue A 730 and the reception FIFO Queue B 732 that may be used to communicate across the first network channel A. The transmission FIFO Queue A 730 may receive data from the device interface 702 to be transmitted across the first network channel A, which may be communicated to the WEP Engine A 730 for encryption in a first-in-first-out manner. The reception FIFO Queue A 730 may receive decrypted data from the WEP Engine A. Data from the reception FIFO Queue A 732 may be transmitted through the device interface 702 in a first-in-first-out manner. A similar transmission FIFO Queue B 734 and a reception FIFO Queue B 736 is included in the MAC related architecture 700 that may be used in connection with communicating across the second network channel B.

The MAC related architecture 700 includes a Power Management Queue ("PMQ") A 750, a PMQ B 752, an Interframe Space ("IFS") A 760, an IFS B 762, a Time Synchronization Function ("TSF") Timer A 770, a TSF Timer B 772, a Network Allocation Vector ("NAV") A 780, and a NAV B 782, that may be used for communicating across network channel A and network channel B respectively.

The MAC related architecture also includes a Programmable State Machine ("PSM") 790 which can handle time critical tasks like transmit processing and receive processing of packet sequences. The MAC related architecture 700 also includes and an Internal Hardware Register ("IHR") 792 which may provide access to hardware control and status information.

Portions of the MAC related architecture 700 may have been replicated by the system logic 540 to support operating a radio in a simultaneous multiband communication mode. One set of MAC related resources may be assigned for use in communicating across each respective network connection or channel for which communication resources of a radio have been allocated for. MAC related resources used by the communication device 510 to support simultaneous multiband communication mode of a radio may include any combination of the elements of the MAC related architecture 700 depicted in FIG. 7. When additional MAC related architecture is requested in connection with a multiband communication mode, the system logic 540 may replicate, for example in memory, additional MAC related architecture for use in simultaneous multiband communication. Similarly, when a radio changes communication modes such that additional MAC related architecture is no longer needed, the system logic 540 may deallocate any such additional MAC related architecture.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
in a Multiple-Input-Multiple-Output ("MIMO") communication device comprising a wireless radio with multiple physical ("PHY") transceiver cores:
  alternately communicating in a time division manner across a first network channel and a second network channel using a first and a second of the multiple PHY transceiver cores together;
  recognizing a first transition indication to operate in a simultaneous multiband communication mode, and in response:
    allocating the first PHY transceiver core from the multiple PHY transceiver cores to communicate across the first network channel;
    allocating the second PHY transceiver core from the multiple PHY transceiver cores to communicate across the second network channel, the second PHY transceiver core different than the first PHY transceiver core;
    transmitting data across the first network channel using the first PHY transceiver core while simultaneously transmitting data across the second network channel using the second PHY transceiver core; and
    receiving, at the first PHY transceiver core, a first beacon message sent by a first access point (AP)

through the first network channel while simultaneously receiving, at the second PHY transceiver core, at least a portion of a second beacon message sent through the second network channel by a second AP that is different than the first AP.

2. The method of claim 1, further comprising providing a register space configured to track that the first PHY core is allocated to the first network channel and that the second PHY core is allocated to the second network channel.

3. The method of claim 1, further comprising:
determining that a transition condition is met to transition operation to a simultaneous operation mode; and
responsively providing the first transition indication.

4. The method of claim 1, wherein recognizing the first transition indication comprises receiving a message from a different communication device that is trying to connect with the MIMO communication device.

5. The method of claim 1, further comprising:
receiving a second transition indication to return to single band communication mode; and
subsequently communicating data in the time division manner over the first and second network channels.

6. The method of claim 1, further comprising:
replicating a pre-existing media access control ("MAC") architecture element; and
assigning the pre-existing MAC architecture element to the first PHY core and assigning the replicated MAC architecture element to the second PHY core to support simultaneously communicating data across the first and second network channels.

7. The method of claim 6, where replicating the pre-existing MAC architecture element comprises replicating the pre-existing MAC architecture element virtually.

8. A communication device comprising:
a first PHY core operable to communicate across multiple network channels;
a second PHY core different from the first PHY core and operable to communicate across multiple network channels; and
a communications controller communicatively coupled to the first PHY core and the second PHY core, the communications controller operable to set a current communication mode of the first PHY core and the second PHY core by selectively changing between:
a single band communication mode in which the first PHY core and the second PHY core communicate data across a network channel in a time division manner; and
a multiband communication mode in which:
the first PHY core is operable to transmit data across a first network channel while the second PHY core is operable to transmit data across a second network channel; and
the first PHY core is operable to receive a first beacon message from a first access point (AP) through the first network channel network while the second PHY core simultaneously receives at least a portion of a second beacon message from a second AP through the second network channel, the second AP different from the first AP.

9. The communication device of claim 8, wherein the communications controller is further operable to selectively change between the single band communication mode and the multiband communication mode in response to receiving a message from a different communication device that is trying to connect with the communication device.

10. The communication device of claim 9, further comprising a register space that tracks the current communication mode of the first PHY core, the second PHY core, or both.

11. The communication device of claim 8, where the communications controller is further operable to selectively change between the single band communication mode and the multiband communication mode in response to recognizing a transition indication.

12. The communication device of claim 8, where the communications controller is further operable to, when setting the current communication mode of the first and second PHY cores to the multiband communication mode:
replicate a pre-existing media access control ("MAC") architecture element; and
assign the pre-existing MAC architecture element to the first PHY core and the replicated MAC architecture element to the second PHY core for supporting the multiband communication mode.

13. The communication device of claim 12, wherein the communications controller is operable to replicate the pre-existing MAC architecture element virtually.

14. The communication device of claim 12, wherein the replicated MAC architecture element comprises a datapath between a host processor interface and a PHY interface, a direct-memory-access ("DMA") channel, an encryption engine, a time synchronization function timer, a First-In-First-Out ("FIFO") queue, or any combination thereof.

15. A method comprising:
in a Multiple-Input-Multiple-Output ("MIMO") communication device comprising a radio configured to communicate according to a particular communication standard, the radio comprising multiple physical ("PHY") cores:
performing a MIMO communication according to the particular communication standard across a first network channel associated with a first network connection using the multiple PHY cores;
receiving a request to communicate according to the particular communication standard across a second network connection;
allocating a first subset of the multiple PHY cores to continue communication across the first network channel;
allocating a second subset of the multiple PHY cores to communicate across a second network channel associated with the second network connection, where the second subset of the multiple PHY cores does not include any PHY cores from the first subset of the multiple PHY cores; and
simultaneously transmitting data according to the particular communication standard across the first network channel using the first subset of the multiple PHY cores and transmitting data according to the particular communication standard across the second network channel using the second subset of the multiple PHY cores; and
receiving, through the first subset of the multiple PHY cores, a first beacon message for the first network connection from a first access point (AP) while simultaneously receiving, through the second subset of the multiple PHY cores, at least a portion of a second beacon message for the second network connection from a second AP different from the first AP.

16. The method of claim 15, further comprising:
transmitting, after allocating the first subset of the multiple PHY cores to continue communication across the first network channel, an indication message to a device communicatively coupled to the communication device through the first network connection, where the indication message indicates the first subset of the multiple PHY cores allocated for communication across the first network connection.

17. The method of claim 15, where the first subset, the second subset, or both comprise a single PHY core.

18. The method of claim 15, further comprising:
replicating a pre-existing media access control ("MAC") architecture element; and
assigning the pre-existing MAC architecture element to the first subset of the multiple PHY cores and assigning the replicated MAC architecture element to the second subset of the multiple PHY cores to support simultaneously communicating data across the first and second network connections.

19. The method of claim 15, further comprising:
receiving a request to communicate across a third network connection; and
allocating a third subset of the multiple PHY cores to communicate across a third network channel associated with the third network connection, where:
the third subset of the multiple PHY cores comprises a PHY core from the first subset of the multiple PHY cores, the second subset of the multiple PHY cores, the multiple PHY cores, or any combination thereof.

20. The method of claim 15, further comprising:
receiving an indication that communication across the second network connection has completed;
allocating the second subset of the multiple PHY cores to communicate across the first network channel; and
performing another MIMO communication across the first network channel using the first subset of the multiple PHY cores and the second subset of the multiple PHY cores.

* * * * *